(12) United States Patent
Nakahara

(10) Patent No.: US 8,892,169 B2
(45) Date of Patent: Nov. 18, 2014

(54) MOBILE TERMINAL, DISPLAY CONTROL METHOD THEREOF, AND NON-TRANSITORY COMPUTER READABLE MEDIUM STORING DISPLAY CONTROL PROGRAM

(71) Applicant: NEC Casio Mobile Communications Ltd., Kawasaki (JP)

(72) Inventor: Toru Nakahara, Kanagawa (JP)

(73) Assignee: NEC Casio Mobile Communications Ltd., Kanagawa (JP)

( * ) Notice: Subject to any disclaimer, the term of this patent is extended or adjusted under 35 U.S.C. 154(b) by 0 days.

(21) Appl. No.: 13/649,824

(22) Filed: Oct. 11, 2012

(65) Prior Publication Data

US 2014/0106821 A1    Apr. 17, 2014

(51) Int. Cl.
*H04B 1/38* (2006.01)
*H04M 1/22* (2006.01)
*H04M 1/725* (2006.01)
*H04W 52/02* (2009.01)

(52) U.S. Cl.
CPC ............ *H04M 1/72519* (2013.01); *H04M 1/22* (2013.01); *H04W 52/027* (2013.01)
USPC .......................... 455/566; 455/457; 455/158.4

(58) Field of Classification Search
CPC ....................................................... H04M 1/22
USPC .......... 455/566, 457, 158.4; 345/207, 60, 690
See application file for complete search history.

(56) References Cited

U.S. PATENT DOCUMENTS 6,765,548 B1 * 7/2004 Doyen et al. .................... 345/60
8,599,148 B2 * 12/2013 Chung et al. .................. 345/173
2005/0078128 A1 * 4/2005 Ozeki ........................... 345/690
2008/0309811 A1 * 12/2008 Fujinawa et al. ......... 348/333.01
2010/0110052 A1 * 5/2010 Togawa .......................... 345/207
2013/0083095 A1 * 4/2013 Chueh et al. .................. 345/691

FOREIGN PATENT DOCUMENTS

| JP | 09190582 A | 7/1997 |
|---|---|---|
| JP | 2002199078 A | 7/2002 |
| JP | 2002344598 A | 11/2002 |
| JP | 20056260 A | 1/2005 |
| JP | 2005109805 A | 4/2005 |
| JP | 2005156746 A | 6/2005 |
| JP | 2005-286738 A | 10/2005 |

(Continued)

OTHER PUBLICATIONS

Office Action dated Feb. 12, 2014, issued by the Japan Patent Office in corresponding Japanese Application No. 2010-229361.

*Primary Examiner* — Sanh Phu
(74) *Attorney, Agent, or Firm* — Sughrue Mion, PLLC

(57) ABSTRACT

A mobile terminal according to an exemplary embodiment includes a display unit that displays predetermined information, a display control unit that controls the display unit, an input unit that allows input of predetermined information, and a setting unit that sets the display unit to a first low brightness display state, in which the first low brightness display state displays the display unit with low brightness. When the setting unit sets a display state of the display unit to the first low brightness display state, the display control unit controls the display unit to display only predetermined information that should be displayed while controlling the display unit to display a background screen of the display unit with lowest brightness or brightness near the lowest brightness, which is first low brightness, at the time of displaying the predetermined information on the display unit.

10 Claims, 8 Drawing Sheets

(56) References Cited

FOREIGN PATENT DOCUMENTS

| JP | 2006-146030 A | 6/2006 |
| JP | 2006197205 A | 7/2006 |
| JP | 2006229736 A | 8/2006 |
| JP | 2006319408 A | 11/2006 |
| JP | 200774651 A | 3/2007 |
| JP | 2008-22406 A | 1/2008 |
| JP | 200820823 A | 1/2008 |
| JP | 2008-148054 A | 6/2008 |
| JP | 2008-219659 A | 9/2008 |
| JP | 200925689 A | 2/2009 |
| JP | 2009105871 A | 5/2009 |
| JP | 2009-124266 A | 6/2009 |
| JP | 2009250705 A | 10/2009 |
| JP | 2009-300515 A | 12/2009 |

* cited by examiner

| ALARM 1<br>12:00 | | ON |
|---|---|---|
| ALARM 2<br>13:00 | | ON |
| ALARM 3 | | OFF |
| ALARM 4 | | OFF |
| ALARM 5 | | OFF |
| ALARM TIME<br>6:00 | START TIME | ON<br>23:00 |

Fig. 3

MOBILE TERMINAL, DISPLAY CONTROL METHOD THEREOF, AND NON-TRANSITORY COMPUTER READABLE MEDIUM STORING DISPLAY CONTROL PROGRAM

INCORPORATION BY REFERENCE

This application is based upon Japanese patent application No. 2010-229361, filed on Oct. 12, 2010, the disclosure of which is incorporated herein in its entirety by reference.

BACKGROUND OF THE INVENTION

1. Technical Field

This application relates to a mobile terminal, a display control method thereof, and a non-transitory computer readable medium storing a display control program.

2. Background Art

A display screen that displays various information is provided on a mobile terminal such as a mobile phone. Visibility of this display screen largely depends on ambient brightness, thus the control for the brightness is an issue to be addressed. Moreover, another issue to be addressed is to save power of the mobile terminal accompanied by the improve in the functions of the mobile terminal. Under those circumstances, control techniques for the display screen of the mobile terminal are under progress in recent years.

As an example of the control techniques for the display screen, there is a technique to adjust brightness of a display screen by a user. Japanese Unexamined Patent Application Publication Nos. 2005-286738, 2006-146030, 2008-219659, 2009-124266, and 2009-300515 disclose techniques in which an illuminance sensor provided on a mobile terminal measures ambient illuminance, and the mobile terminal automatically adjusts brightness of a display screen based on the measured illuminance. Moreover, Japanese Unexamined Patent Application Publication No. 2008-148054 discloses a technique to display only information specified as useful by a user for each event on the mobile terminal and reduce information not necessarily useful for the user.

Further, as the mobile terminals deal with emergency communications, users often leave the mobile terminal by the bed. For example, Japanese Unexamined Patent Application Publication No. 2008-022406 discloses a technique to notify a user of an incoming call or mail received in a limited time zone by light. As described above, many cases occur in which the user activates the mobile terminal and looks at the screen display in the middle of the night in order to respond to an emergency call or incoming mail. With a timer function provided on the mobile terminal such as the mobile phone, the users often use the mobile terminal as an alarm using this timer function. In such a case, the user frequently activates the mobile terminal and looks at the screen display immediately after waking up to check the time.

When the user uses the mobile terminal immediately after waking up from the sleep as in the above case, the brightness of the screen display of the mobile terminal is often adjusted to the level not causing a difficulty for the user to use the mobile terminal in a normal state. If the user looks at the display screen adjusted to the brightness used in the normal state, the user would be suffered from discomfort caused by glare. The screen display with high brightness every time the mobile terminal is activated would also consume unnecessary current.

However, in the system in which the user manually adjusts the brightness of the display screen, the user needs to adjust the brightness every time so as to optimize the display brightness and save the electricity of the terminal, which is inconvenient. Additionally, once the user sets the display screen to high brightness, the user frequently leave the setting of high brightness as it is. In such a case, optimization of the display brightness and power saving of the terminal cannot be achieved.

As in Japanese Unexamined Patent Application Publication Nos. 2005-286738, 2006-146030, 2008-219659, 2009-124266, and 2009-300515, in the abovementioned techniques that adjust the brightness of the display screen by the illuminance sensor, the present inventor has found a problem that the detection operation by the illuminance sensor consumes excessive electricity. The technique disclosed in Japanese Unexamined Patent Application Publication No. 2008-022406 is related to the control for illuminating the display screen in response to an incoming call or mail and not related to reduce the brightness of the screen display.

As a number of symbols called icons are displayed on the display screen of the mobile terminal, the user cannot obtain time information in a glance, for example, that is required by the user, and is forced to search in the display of the mobile terminal for a long time, which poses a problem in usage. Japanese Unexamined Patent Application Publication No. 2008-148054 discloses the technique to reduce the information other than the specified information from the screen and not the technique to set the brightness of the entire display screen.

SUMMARY

An exemplary object of the invention is provide a mobile terminal that is capable of optimizing display brightness and screen display content and reducing power consumption, a display control method for the mobile terminal, and a non-transitory computer readable medium storing a display control program.

In a first exemplary aspect of the invention is a mobile terminal that includes a display unit that displays predetermined information, a display control unit that controls the display unit, an input unit that allows input of predetermined information, and a setting unit that sets the display unit to a first low brightness display state, in which the first low brightness display state displays the display unit with low brightness. When the setting unit sets a display state of the display unit to the first low brightness display state, the display control unit controls the display unit to display only predetermined information that should be displayed while controlling the display unit to display a background screen of the display unit with lowest brightness or brightness near the lowest brightness, which is first low brightness, at the time of displaying the predetermined information on the display unit.

In a second exemplary aspect of the invention is a display control method for a mobile terminal including a display unit that includes setting a display state of the display unit to a first low brightness display state for displaying the display unit with low brightness, and controlling the display unit to display only information that should be displayed while controlling the display unit to display a background screen of the display unit with lowest brightness or brightness near the lowest brightness, which is first low brightness, at the time of displaying predetermined information on the display unit.

In a third exemplary aspect of the invention is a non-transitory computer readable medium that stores a display control program for a mobile terminal including a display unit. The display control program causes the mobile terminal to perform a process including setting a state of the display unit to a first low brightness display state for displaying the display unit with low brightness, and controlling the display unit to display only information that should be displayed while controlling the display unit to display a background screen of the display unit with lowest brightness or brightness near the lowest brightness, which is first low brightness, at the time of displaying predetermined information on the display unit.

Accordingly, it is possible to provide a mobile terminal capable of optimizing display brightness and screen display content and reducing power consumption, a display control method for the mobile terminal, and a non-transitory computer readable medium storing a display control program.

BRIEF DESCRIPTION OF THE DRAWINGS

The above and other aspects, features, and advantages of the present invention will become more apparent from the following description of certain exemplary embodiments when taken in conjunction with the accompanying drawings, in which:

FIG. 3 is a diagram showing an example of an alarm setting screen according to a second exemplary embodiment;

EXEMPLARY EMBODIMENTS

First Exemplary Embodiment

Figure 1:
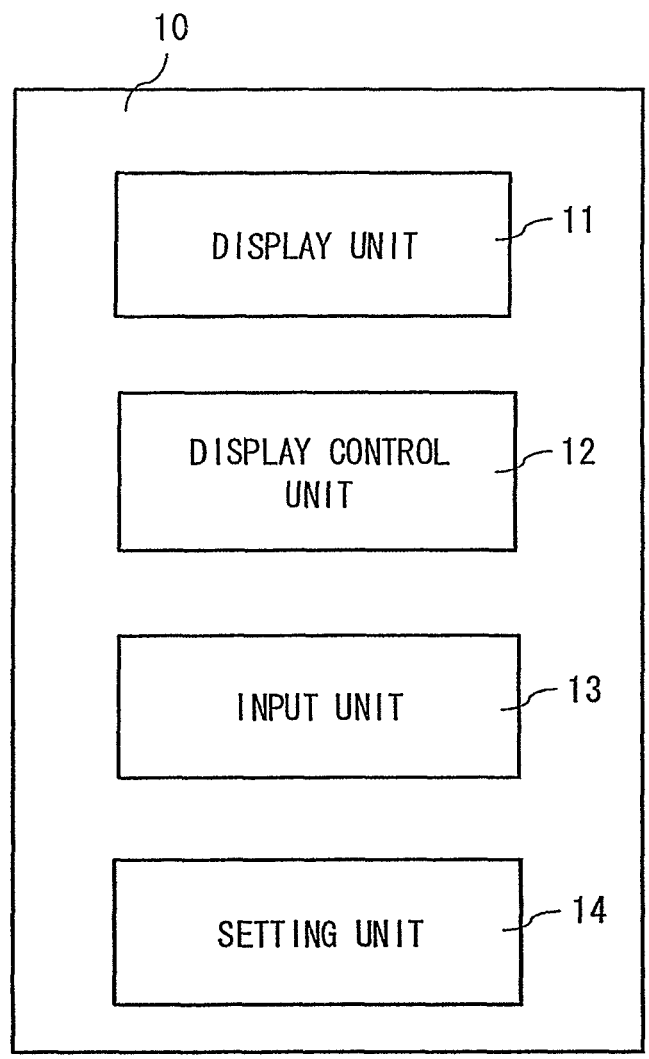
FIG. 1 is a block diagram showing an example of an entire configuration of a mobile terminal according to a first exemplary embodiment.

Hereinafter, a first exemplary embodiment is explained with reference to FIG. 1. FIG. 1 is a block diagram showing an example of an entire configuration of a mobile terminal 10 according to this exemplary embodiment. The mobile terminal 10 includes a display unit 11, a display control unit 12, an input unit 13, and a setting unit 14. The mobile terminal 10 is a mobile terminal, such as a mobile phone, a PHS (Personal Handy-phone System), a Personal Digital Assistant, and a smartphone.

The display unit 11 displays to the user predetermined information on the mobile terminal 10. The display unit 11 can display the predetermined information on a background screen with arbitrary brightness. This display unit 11 is composed of a display, such as a liquid crystal display, an OEL (Organic Electro-Luminescence) display and an inorganic electro-luminescence display, and/or a light source such as LED (Light Emitting Diode). Moreover, the "predetermined information" is information displayed on a common mobile terminal, including current time, an incoming call or mail, remaining battery capacity of the mobile terminal, radio wave strength, silent mode setting, and alarm function setting.

The display control unit 12 controls the display unit 11 to display the predetermined information on a background screen with arbitrary brightness. This display control unit 12 is composed of a CPU (Central Processing Unit), ROM (Read Only Memory), RAM (Random Access Memory) and the like in the mobile terminal 10. For example, the CPU controls the mobile terminal 10 by reading a program stored to the ROM and various application programs loaded to the RAM. The ROM stores various programs for controlling the mobile terminal 10, and RAM stores data necessary for the CPU to execute various processes as appropriate. Note that other non-volatile memories may be used instead of the ROM.

The input unit 13 is a unit operable by the user to enable the user to supply information to the mobile terminal 10 using the input unit 13. The input unit 13 is composed of key buttons on the mobile terminal 10 and/or a pointing device such as a touch panel and a touch pad.

The setting unit 14 is operative to set the display unit 11 to a first low brightness display state. The "first low brightness display state" indicates a state of displaying the background screen of the display unit with first low brightness. The details of the first low brightness display state are explained later. The setting unit 14 is composed of the alarm function of the mobile terminal 10 and the key buttons provided on the mobile terminal 10, for example.

Hereinafter, content of control performed by the display control unit 12 is explained. Note that the setting unit 14 sets the display state of the display unit 11 to the abovementioned first low brightness display state. First, the display control unit 12 controls the display unit 11 to display the predetermined information. At this time, the display control unit 12 controls the display unit 11 to display only predetermined information that should be displayed while controlling the display unit 11 to display the background screen of the display unit 11 with lowest brightness or brightness near the lowest brightness.

The "lowest brightness" here indicates brightness of the same degree as ambient environment in the case where the ambient environment of the mobile terminal 10 is sufficiently dark such as midnight. Discomfort such as glare can be reduced by the user looking at the background screen set to the lowest brightness or the brightness near the lowest brightness, which is the first low brightness, as compared to the background screen with normal brightness.

Further, the abovementioned "predetermined information that should be displayed" indicates information with higher necessity or priority for the user among the "predetermined information". For example, when the mobile terminal 10 has an incoming call or mail, the "information that should be displayed" indicates information regarding the incoming call or mail. Alternatively, when the mobile terminal 10 has no incoming call or mail, the "information that should be displayed" indicates the information regarding the current time. Note that even when an incoming call or mail is received, the information of the current time may be also displayed as the "information that should be displayed".

As described above, the user can see the screen that is controlled to the low brightness display and displaying only the information that should be displayed. This enables optimization of the display brightness in the mobile terminal. Moreover, reduction of power consumption can also be achieved by controlling the background screen to the low brightness. From the above explanation, this exemplary embodiment can provide a mobile terminal that is capable of optimizing the display brightness and screen display content and reducing the power consumption.

Second Exemplary Embodiment

Figure 2:
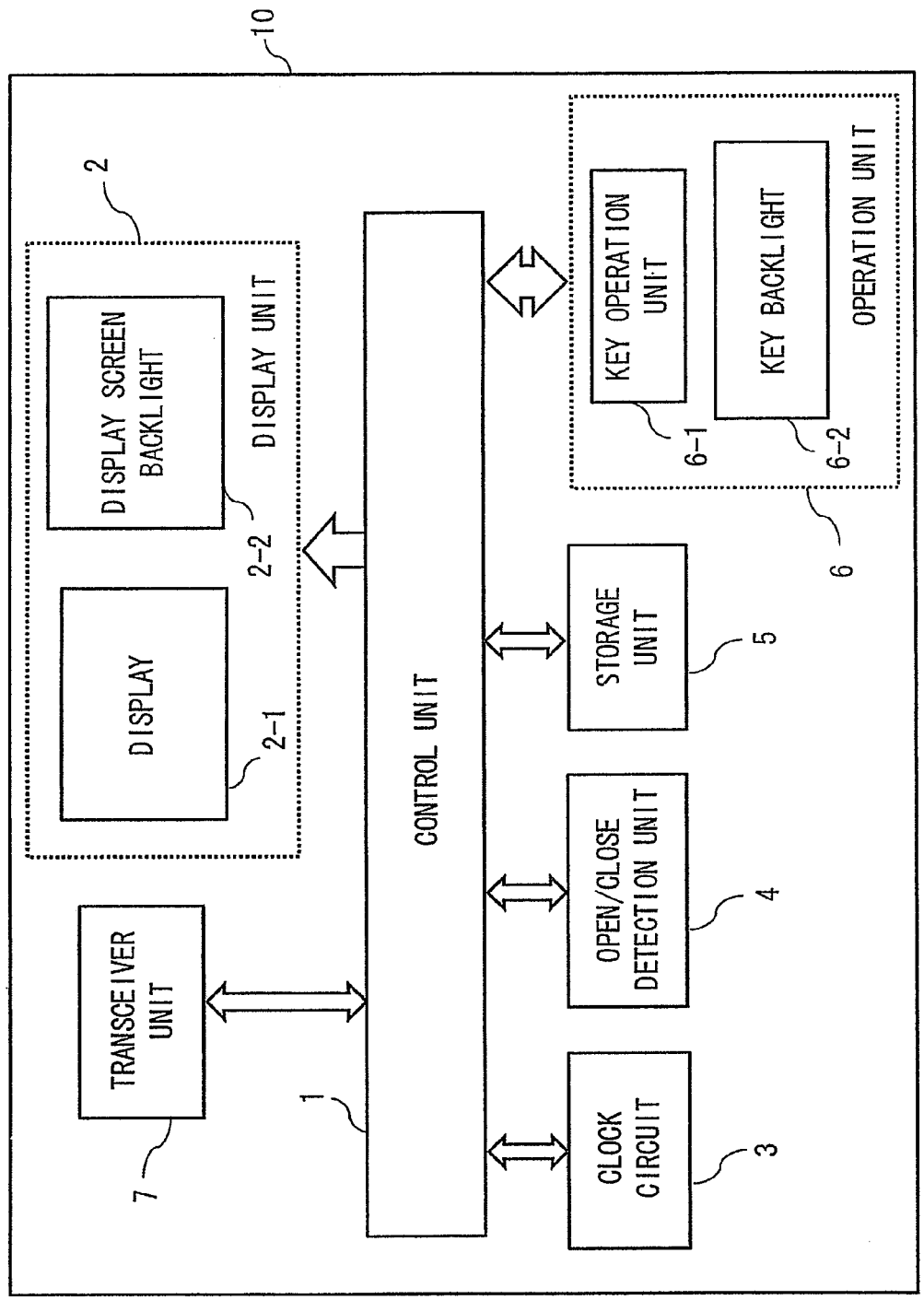
FIG. 2 is a block diagram showing an example of an entire configuration of the mobile terminal according to a second exemplary embodiment.
Figure 4:
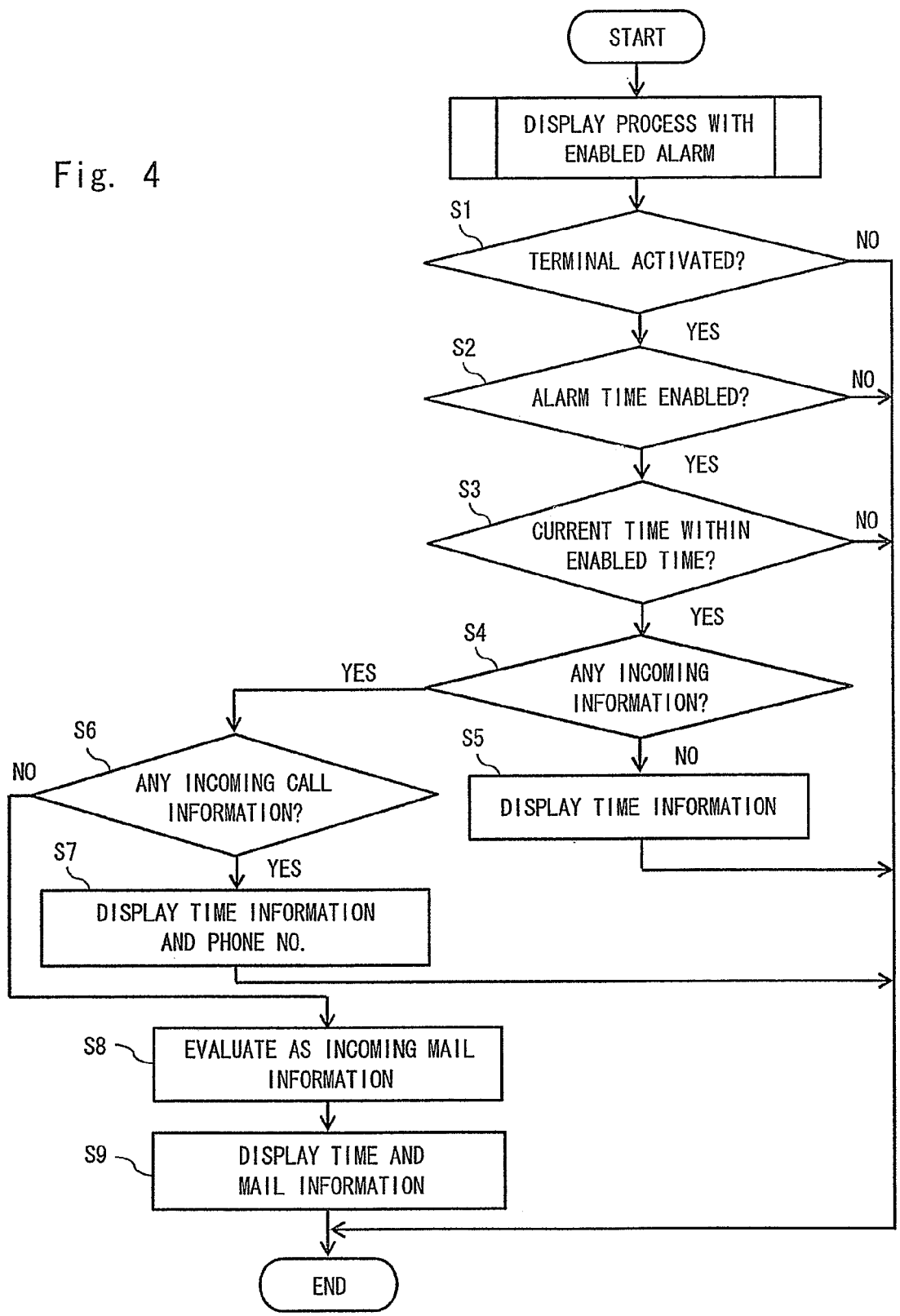
FIG. 4 is a flowchart showing an example of a control flow for display control according to the second exemplary embodiment.
Figure 5:
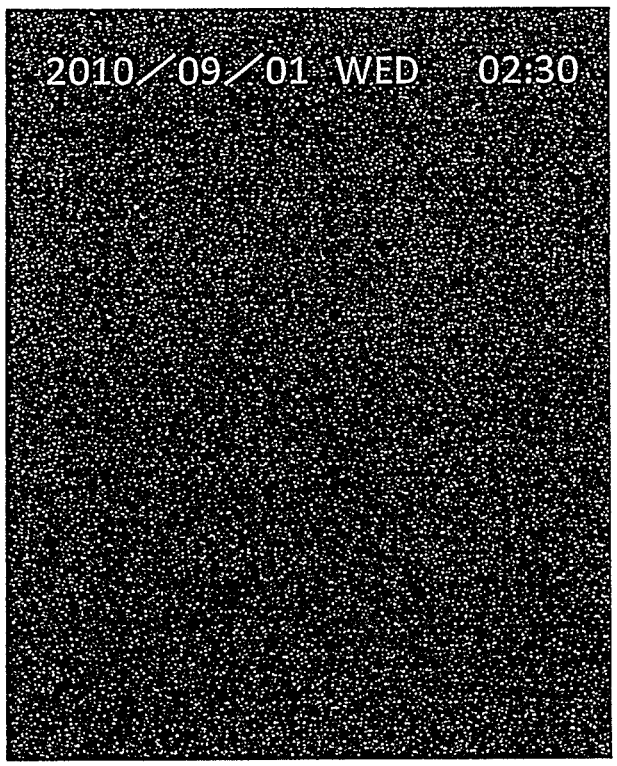
FIG. 5 is a diagram showing an example of a first screen display according to the second exemplary embodiment.
Figure 6:
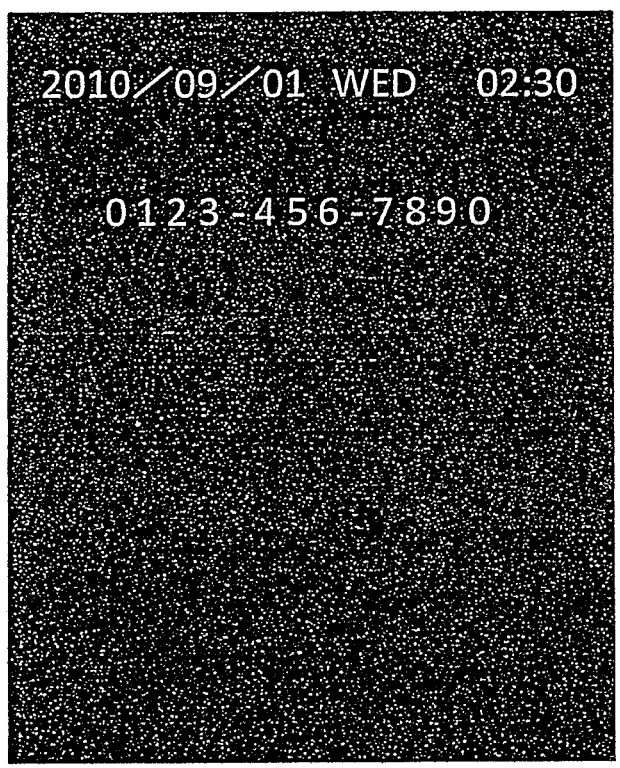
FIG. 6 is a diagram showing an example of a second screen display according to the second exemplary embodiment.
Figure 7:
FIG. 7 is a diagram showing an example of a third screen display according to the second exemplary embodiment.
Figure 8:
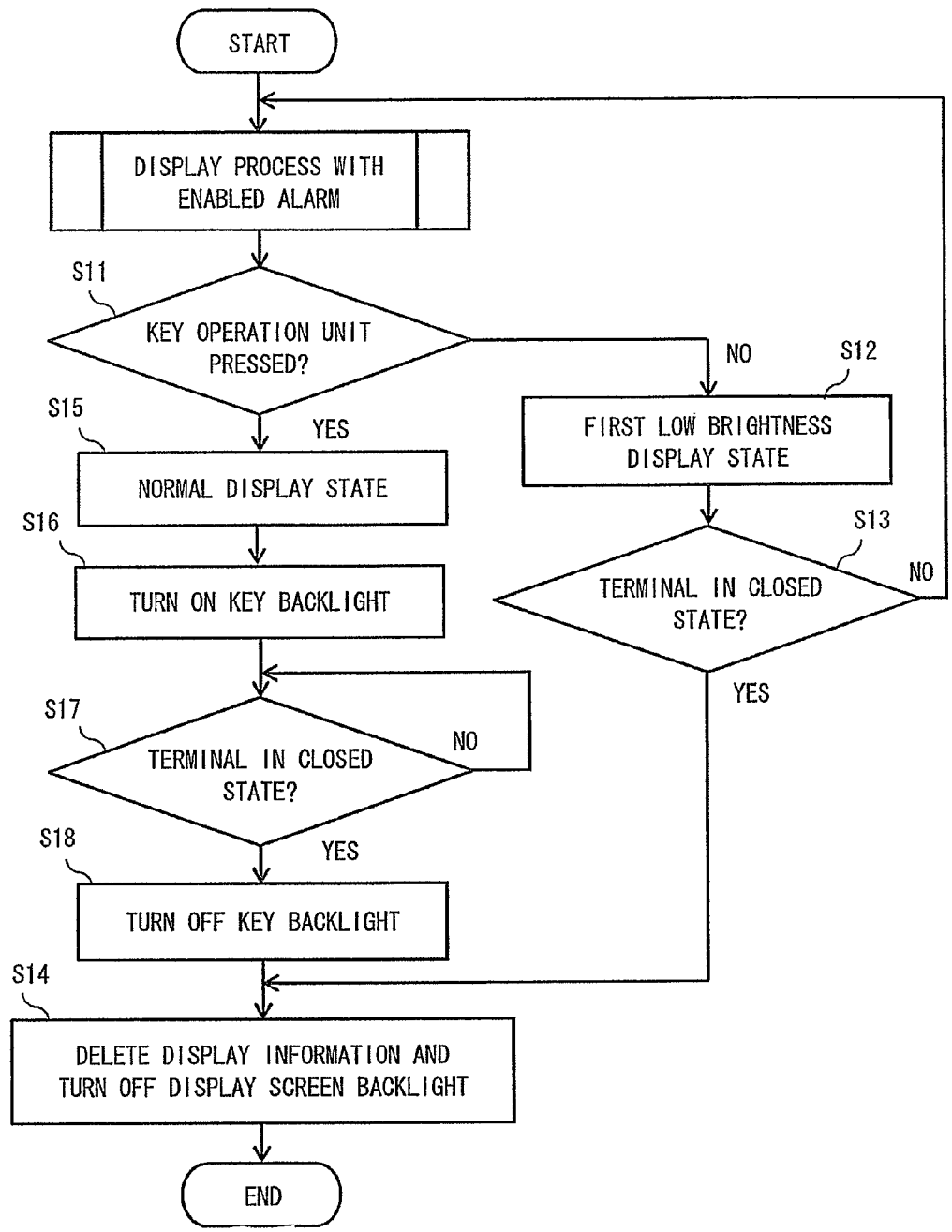
FIG. 8 is a flowchart showing an example of a control flow for control upon a key press according to the second exemplary embodiment.

Hereinafter, a second exemplary embodiment is explained with reference to the drawings. FIG. 2 is a block diagram showing an example of an entire configuration of a mobile terminal according to this exemplary embodiment. FIG. 3 shows an alarm setting screen example on a screen of the mobile terminal according to this exemplary embodiment. FIG. 4 is a flowchart showing an example of a control flow for screen display control according to this exemplary embodiment. FIG. 5 is a diagram showing a first screen display example according to this exemplary embodiment, in which the screen displays only time information and date information as text information. FIG. 6 is a diagram showing a second screen display example according to this exemplary embodiment, in which the screen displays only time, date, and an incoming call number as text information. FIG. 7 is a diagram showing a third screen display example according to this exemplary embodiment, in which the screen displays only time, date, and an incoming mail as text information. FIG. 8 is a flowchart showing an example of a control flow for display control of the screen upon a key press according to this exemplary embodiment.

First, an entire configuration of a mobile terminal 10 according to this exemplary embodiment is explained using FIG. 2. The mobile terminal 10 in this exemplary embodiment includes a control unit 1, a display unit 2, a clock circuit 3, an open/close detection unit 4, a storage unit 5, an operation unit 6, and a transceiver unit 7. The control unit 1 controls functions of the mobile terminal 10, and the display unit 2 displays images and information. The clock circuit 3 counts time, and the open/close detection unit 4 detects an open/closed state of the mobile terminal. The storage unit 5 saves information data, and the operation unit 6 supplies information by a press on the buttons. The transceiver unit 7 performs wireless communication. The mobile terminal 10 is a foldable mobile terminal such as a mobile phone, a PHS, and the like. Note that the display unit 11, the display control unit 12, the input unit 13, and the setting unit 14 in the first exemplary embodiment respectively correspond to the display unit 2, the control unit 1, the operation unit 6, the clock circuit 3, and the storage unit 5 in FIG. 2.

The control unit 1 is a control circuit that governs function control of the mobile terminal 10, and receives information data transmitted from the display unit 2, the clock circuit 3, the open/close detection unit 4, the storage unit 5, the operation unit 6, and the transceiver unit 7, processes the received information data, and transmits control data to each unit. Although not shown here, the control unit 1 is composed of a CPU, a RAM, and the like in the mobile terminal 10.

The display unit 2 displays images and information in the mobile terminal 10. The display unit 2 includes a display 2-1 that displays information and the like and a display screen backlight 2-2. The display 2-1 is a display screen of the mobile terminal 10, and is a liquid crystal display in the second exemplary embodiment. Moreover, the display screen backlight 2-2 is composed of a downsizable light source, and is an LED in the second exemplary embodiment. The display screen backlight 2-2 has a function to light up from the back of the display 2-1 and vary the brightness of the display 2-1.

Given below is an explanation of image control performed by the display unit 2. The display unit 2 displays an image on the display 2-1 according to the data of image display information transmitted from the control unit 1. Specifically, the display unit 2 applies voltage corresponding to a display image on the display 2-1, which is a liquid crystal display, and determines transmission and blocking of light emit from the display screen backlight 2-2. The display unit 2 performs such control to the display 2-1 and control to adjust the brightness of the display screen backlight 2-2 according to brightness adjustment data transmitted from the control unit 1. Above configuration enables variable control by the display unit 2 on the light transmitted through the display 2-1 to the user i.e., brightness of the screen display.

The clock circuit 3 is a circuit of a clock for counting time and has a function to transmit to the control unit 1 time data at the time of request from the control unit 1. The clock circuit 3 is composed of an IC (Integrated Circuit) and the like including a CPU, a ROM, and a RAM, for example. Note that the time data in the second exemplary embodiment includes current day, month, and year, in addition to the current time.

The open/close detection unit 4 has a function to detect whether the mobile terminal 10 is folded (hereinafter referred to as a closed state) or the mobile terminal 10 is not folded and the display unit 2 is visible to the user (hereinafter referred to as an open state). The open/close detection unit 4 transmits the detected open/closed state of the mobile terminal 10 to the control unit 1 as open/close information. For example, when the mobile terminal 10 is powered on and the open/close detection unit 4 detects that the user opened a housing of the mobile terminal 10, the open/close detection unit 4 transmits to the control unit 1 the information that the mobile terminal 10 has entered the opened state. In response to the information that the mobile terminal 10 has entered the opened state, the control unit 1 transmits the control data to each unit of the mobile terminal 10, for example, to control the key operation unit 6-1 in the operation unit 6 to be ready for input, while controlling the display unit 2 to display the screen. In this way, the control unit 1 sets the mobile terminal 10 to be in an activated state. The open/close detection unit 4 is composed of an IC and the like including therein a CPU, a ROM, and a RAM, for example.

The storage unit 5 has a region to save the information data transmitted from the control unit 1, and reads and writes the information data according to the control by the control unit 1. Moreover, the screen information and the like that is previously stored to the mobile terminal 10 is also saved to the storage unit 5. The saved information data includes screen data to be displayed on the display 2-1, brightness data of the display screen backlight 2-2 at the time of displaying the screen data, time setting registered by the user, and data including telephone numbers and mail addresses. In other words, the information data saved to the storage unit 5 is data used while using the mobile terminal 10. Note that the storage unit 5 is composed of a ROM, a RAM, or an auxiliary storage device in the mobile terminal 10.

The operation unit 6 includes a key operation unit 6-1 that has buttons to be pressed by the user and a key backlight 6-2 that illuminates the key operation unit 6-1. When the user presses the buttons and operates the key operation unit 6-1, the information input by the user is transmitted from the key operation unit 6-1 to the control unit 1. When the control unit 1 transmits the information input by the user to the storage unit 5, the input information is stored inside the mobile terminal 10. Further, the key backlight 6-2 illuminates the entire operation unit 6 by performing lighting up and down operations according to the control data of the control unit 1. In a state normally used by the user, the control unit 1 turns on the key backlight 6-2 in response to detection of the activation of the mobile terminal by opening the housing of the mobile terminal 10 and detection of input information and the like from the key operation unit 6-1. In such a way, the control unit 1 controls the operation unit 6 in a way to provide the user with ease of viewing. Note that the key operation unit 6-1 is keys provided on the mobile terminal 10 for the user to input numbers and text, and key buttons for performing various application functions such as telephone, mail, camera, and Internet connection. The light source of the key backlight 6-2 is composed of a circuit such as LED that can vary the brightness.

The transceiver unit 7 is composed of a wireless circuit and has a function to wirelessly connect to a base station, and transmit and receive wireless information with the base station. The control unit 1 controls the transceiver unit 7, and the transceiver unit 7 obtains incoming call numbers and mail messages. For example, when the user inputs information of a telephone number on the key operation unit 6-1, the information of the input telephone number is transmitted to the control unit 1. The control unit 1 transmits the control data to the transceiver unit 7 in response to the input number information so as to control the transceiver unit 7 to issue a connection request to a mobile terminal with the input number.

Next, a display control method for the display unit 2 according to this exemplary embodiment is explained. FIG. 3 is an example of an alarm setting screen. In the alarm setting screen of FIG. 3, an input screen for setting "alarm time" is provided separately from an input screen from "alarm 1" to "alarm 5", which are normal alarm setting menus. In the example of FIG. 3, the "alarm time" is set for 6:00 (6 a.m.). Note that in the example of FIG. 3, an input screen is also provided for setting bedtime as "start time" besides the "alarm time". In FIG. 3, the "start time" is set for 23:00 (11:00 p.m.). The user can separately input the "start time" and the "alarm time". Once the user inputs the "start time" and the "alarm time" on the key operation unit 6-1, the "start time" and the "alarm time" is stored to the storage unit 5 via the control unit 1. Moreover, the information of the "start time" and the "alarm time" input by the user is stored to the storage unit 5 as it is unless the user reenters the "start time" and the "alarm time". In a similar manner as the alarm function from the "alarm 1" to "alarm 5", "ON" and "OFF" to enable or disable the function of the "alarm time" can be set. The example of FIG. 3 illustrates the state in which the "alarm time" is enabled i.e., the "alarm time" is set to "ON". In this exemplary embodiment, the "alarm time" functions as a trigger to change the screen display from normal display to the screen of black background at the time of display control.

Note that in this exemplary embodiment, the time zone from the "start time" to the "alarm time" is defined as an "enabled time zone" (limited time zone), and other time zones are defined as "disabled time zone". For example, in the setting example shown in FIG. 3, the time zone from 23:00 to 6:00 is defined as the "enabled time zone", and other time zones are defined as the "disabled time zone".

Next, specific display control of this exemplary embodiment is explained. FIG. 4 is a control flow showing display control of the screen performed by the control unit 1 in a state where the alarm function shown in FIG. 3 is set in this exemplary embodiment. First, the control unit 1 evaluates whether or not the mobile terminal 10 is in the activated state (step S1). When the control unit 1 evaluates that the user has not opened the housing and the mobile terminal 10 is not in the activated state (No in the step S1), the control unit 1 does not control the display unit 2 to perform display and ends the process of the display control.

When the user opens the housing of the mobile terminal 10, the control unit 1 detects the operation of opening the housing from the open/close information transmitted from the open/close detection unit 4 and controls the mobile terminal 10 to be in the activated state (Yes in the step S1). In this case, the control unit 1 controls the display unit 2 to perform display as described below. First, the control unit 1 evaluates whether or not the function of the "alarm time" is enabled, which is registered to the storage unit 5 (step S2). When the control unit 1 evaluates that the "alarm time" is set to "OFF" i.e., the function of the "alarm time" is disabled (No in the step S2), the control unit 1 controls the display unit 2 to display a normal screen set by the user. When the normally set screen is displayed, the brightness of the screen display is a brightness level used by the user in a normal state. Further, the control unit 1 turns on the key backlight 6-2. The control unit 1 ends the process of the display control after performing the above processes.

When the control unit 1 evaluates that the "alarm time" is set to "ON" i.e., the function of the "alarm time" is enabled (Yes in the step S2), the control unit 1 obtains the current time data from the clock circuit 3. The control unit 1 compares the current time with the enabled time zone based on the "alarm time" and the "start time" using the current time data, and evaluates whether or not the current time is within the enabled time zone (whether or not the current time is within the enabled time) (step S3). For example, in the case where the time the user opened the housing of the mobile terminal 10 is 2:30 a.m., the control unit 1 evaluates that the current time is within the specified enabled time zone between the "start time" 23:00 and the "alarm time" 6:00 (Yes in the step S3), and transitions to the next evaluation process. Note that in the case where the time the user opened the housing is in the disabled time zone (for example 9 a.m.) (No in the step S3), the control unit 1 controls the display unit 2 to display the normal screen set by the user, turns on the key backlight 6-2, and then ends the process of the display control.

When the control unit 1 evaluates that the current time is within the enabled time zone, the control unit 1 searches for information regarding an incoming call or mail in the transceiver unit 7 and evaluates existence of incoming information (step S4). When there is no incoming information (No in the step S4), the control unit 1 reads information of the time data from the clock circuit 3, and controls the display unit 2 to display the time in the first low brightness display state (step S5). At this time, the control unit 1 does not perform control to turn on the key backlight 6-2 and leaves the key backlight 6-2 off to end the process of the display control.

FIG. 5 shows a screen display example (a first screen display example) when the display unit 2 displays the time in the first low brightness display state in the step S5. In the screen display of FIG. 5, the background is a black screen with only the time data displayed in white. The control unit 1 obtains display data with the black screen as the background that is registered to the storage unit 5, and transmits the control data to control the display 2-1 to display the display data with the black screen as the background, so as to display the background screen on the display 2-1. At the same time, the control unit 1 obtains the time data from the clock circuit 3, and by the similar control, displays the time data in white on the display 2-1. Note that "black" here does not indicate only jet black but includes colors with low lightness such as purple black and ink black. Similarly, the color of text display "white" does not indicate only pure white but includes colors with high lightness such as pearl gray, milky white, and gray white.

Further, when the control unit 1 performs the control to display the screen of FIG. 5, the control unit 1 sets the brightness of the background screen on the display unit 2 to a weak light state (the first low brightness display state) which is darker than the normally set brightness. In a similar manner as the first exemplary embodiment, the first low brightness indicates the brightness of the same degree as ambient environment in the case where the ambient environment of the mobile terminal 10 is sufficiently dark such as midnight. The control unit 1 controls the display 2-1 and the display screen backlight 2-2 to set the brightness of the background screen of the display unit 2 to the first low brightness. Specifically, the control unit 1 reduces the brightness of the display screen backlight 2-2 so that the text displayed on the display screen will not glare in a dark environment such as midnight. In particular, the control unit 1 reduces the light emit from the text display part on the display screen (the part with high transmittance of light). At this time, as the transmittance of light is low in the background screen of the display screen, the brightness of the light emit from the backlight is at a sufficiently low level. As described above, the control unit 1 controls the display unit 2 to have the black screen as the background and display the text information in white with the brightness set to reduce glare.

Note that widely-known control for the above brightness control includes power supply control by existing techniques such as PWM (Pulse Width Modulation) and weak light control by reducing voltage to be applied on the LED. For example, when using PWM in this exemplary embodiment, it is possible to readily realize the first low brightness display state by increasing the cycle to turn on the display screen backlight 2-2. By the above control, the display unit 2 is set to the first low brightness display state and displays the screen with the time information in white on the black background screen. At this time, the key backlight 6-2 is turned off.

Next, a case is explained when the control unit 1 searches for the incoming information from the transceiver unit 7 (step S4), the control unit 1 detects the incoming information (Yes in the step S4). First, the control unit 1 evaluates whether the detected incoming information is from another phone (step S6). When the control unit 1 evaluates that the incoming information is from another phone (Yes in the step S6), the control unit 1 controls the display unit 2 to display the time data obtained from the clock circuit 3 together with the information of a caller telephone number obtained from the transceiver unit 7 in the first low brightness display state (step S7). The control unit 1 does not perform the control to turn on the key backlight 6-2 and leaves the key backlight 6-2 off in a similar manner as the step S5.

FIG. 5 is a screen display example (a second screen display example) when the display unit 2 displays the telephone number and the time data in the first low brightness display state in the step S7. Note that the control method of the control unit 1 for the display 2-1 and the display screen backlight 2-2 is similar to the control method for the screen display in the abovementioned step S5. By the above control, the display unit 2 is set to the first low brightness display state and displays the screen with the time data and the caller telephone number in white on the black background, as shown in FIG. 6. The control unit 1 ends the process of the display control after performing the above processes.

In the step S6, when the control unit 1 evaluates that the incoming information is not from another telephone (No in the step S6), the control unit 1 evaluates that the detected incoming information is an incoming mail (step S8). The control unit 1 controls the display unit 2 to display the time data obtained from the clock circuit 3 together with the information of the mail obtained from the transceiver unit 7 in the first low brightness display state (step S9). Moreover, the key backlight 6-2 remains to be off in a similar manner as the step S5.

FIG. 6 shows a screen display example (a third screen display example) when the display unit 2 displays reception information of the mail and the time data in the first low brightness display state in the step S9. The control method of the control unit 1 for the display 2-1 and the display screen backlight 2-2 is similar to the control method for the screen display in the steps S5 and S7. Note that in the screen display example of FIG. 6, when an incoming mail is received, the control unit 1 refers to the data of the mail address stored to the storage unit 5, determines a sender of the incoming mail, and controls the display unit 2 to display the mail address. By the above control, the display unit 2 displays the screen showing the time data and the sender telephone number in white on the black background set to the first low brightness display state, as shown in FIG. 7. The control unit 1 ends the process of display control after performing the above processes.

By the above control, the user can look at the screen with the optimized brightness and optimized information content when the user opens the housing of the mobile terminal 10 in order to obtain the time and incoming information immediately after waking up from the sleep in the time zone specified as the enabled time zone (for example, midnight). That is, it is possible to configure the screen to display the background screen set to the lowest brightness or near the lowest brightness in the enabled time, thereby reducing the discomfort such as glare when the user looks at the screen. Further, only the information that should be displayed with higher importance for the user such as the time information and the information regarding an incoming phone and mail is displayed in a noticeable manner i.e., displayed in white letters, thus the user can obtain important information at a glance. Moreover, as the brightness of the background screen is the lowest brightness or near the lowest brightness, and the key backlight 6-2 is turned off, the power consumption of the mobile terminal 10 can be reduced.

Note that when the incoming information is both for a telephone call and mail, the information for both may be displayed in white on the black background in a similar manner as the above case.

Next, another control by the control unit 1 is explained using FIG. 8 in a state where the alarm setting is enabled, and when the user opens the housing of the mobile terminal 10 in the specified enabled time zone, any key of the key operation unit 6-1 of the mobile terminal 10 is pressed. First, the control unit 1 evaluates whether the key operation unit 6-1 is pressed by detecting the information transmitted from the key operation unit 6-1 (step S11).

In the step S11, when the control unit 1 evaluates that the user has not performed an operation to press the button (No in the step S11), the control unit 1 controls the display unit 2 to continue displaying the abovementioned screen state in which the information is displayed in white on the black background screen in the first low brightness display state (step S12).

After the process of the step S12, the control unit 1 evaluates the open/closed state of the mobile terminal 10 based on the information from the open/close detection unit 4 (step S13). When the control unit 1 evaluates that the mobile terminal 10 remains in the opened state (No in the step S13), the control unit 1 returns to the step S11 and performs the process.

When the control unit 1 evaluates that the mobile terminal 10 is in the closed state in the step S13 (Yes in the step S13), the control unit 1 controls the display unit 2 to delete the information displayed on the display unit 2 and turn off the display screen backlight 2-2 (step S14). Namely, the control unit 1 deletes the display of the display unit 2. The control unit 1 returns the mobile terminal 10 to the original state, and ends this control. After this control ends, when the user opens the mobile terminal 10 again in the specified enabled time zone, the user will see the abovementioned screen in the first low brightness display state again.

When the control unit 1 evaluates that the user pressed any key of the key operation unit 6-1 (Yes in the step S11), the control unit 1 controls the display unit 2 to abort the first low brightness display state and transition to the normal display state according to the input information detected by the key operation unit 6 (step S15). Further, the control unit 1 controls the key backlight 6-2 to light up (step S16). By the above control, the mobile terminal 10 returns to the normal activated state, and the user can return the screen display and the illumination operation of the key backlight 6-2 to the original state even in the enabled time zone of the alarm setting. Specifically, the mobile terminal 10 enters the normal activated state when the user presses the key to use the mobile terminal 10, and then the user can use the mobile terminal 10 as usual.

After the process of the step S16, the control unit 1 evaluates the open/closed state of the mobile terminal 10 based on the information from the open/close detection unit 4 (step S17). When the control unit 1 evaluates that the mobile terminal 10 remains in the opened state (No in the step S17), the control unit 1 returns to the step S17 and performs the processes.

When the control unit 1 evaluates that the mobile terminal 10 is in the closed state in the step S17 (Yes in the step S17), the control unit 1 performs control to turn off the key backlight 6-2 (step S18), and controls the display unit 2 to delete the information displayed on the display unit 2 and turn off the display screen backlight 2-2 (step S14). The control unit 1 returns the mobile terminal 10 to the original state as described above and ends this control. After this control ends, when the user opens the mobile terminal 10 again in the specified enabled time zone, the user will see the screen in the abovementioned first low brightness display state again.

By the above control, the user can return the mobile terminal 10 to the normal activated state by operating the key operation unit 6-1 even when the mobile terminal 10 is in the screen display state in the first low brightness display state. Moreover, the mobile terminal 10 can return to the screen display state in the first low brightness display state again by the user closing the mobile terminal 10.

From the above explanation, the mobile terminal according to this exemplary embodiment have the following exemplary advantages. The first exemplary advantage is to reduce the discomfort such as glare at the time when the user looks at the display immediately after the user wakes up from the sleep. A second exemplary advantage is to allow the user to grasp the information content in a glance by displaying only minimal information on the screen. A third exemplary advantage is to reduce the power consumption of the mobile terminal when the user activates the mobile terminal only to check the time or incoming information and does not operate the mobile terminal while asleep. This can be achieved by the control unit controlling illumination of the display screen and the key backlight. A fourth exemplary advantage is that the control unit can optimize the brightness of the display screen without a special sensor such as an illuminance sensor provided on the mobile terminal. This reduces the power consumption of the illuminance sensor and the like. Given these points, it is possible to provide the mobile terminal capable of optimizing the display brightness and screen display content and reducing the power consumption.

Note that the present invention is not limited to the above exemplary embodiments, but various modifications understood by those skilled in the art can be made within the scope of the present invention without departing from the spirit thereof. For example, the same exemplary advantages can be obtained by a dedicated button provided on the mobile terminal except for the alarm setting, and starting or ending to control the display unit 2 by a press of this dedicated button.

Moreover, the order of the steps to be processed may be changed as appropriate in the control flow according to the second exemplary embodiment. For example, in FIG. 4, either of the steps S2 and S3 may be performed first, in which the step S2 evaluates whether or not the function of the "alarm time" is enabled, and the step S3 evaluates whether or not the current time is within the enabled time zone. Additionally, in the step S6, instead of evaluating the existence of the incoming call information, the existence of the incoming mail information may be evaluated. Further, in FIG. 8, either of the steps S15 and S16 may be performed first, in which the step S15 controls the display unit 2 to the normal display state, and the step S16 controls the key backlight 6-2 to light up. Similarly in FIG. 8, either of the steps S18 and S14 may be performed first, in which the step S18 turns off the key backlight 6-2 when the user closes the terminal in the normal display state, and the step S14 turns off the display screen backlight 2-2.

Furthermore, in the second exemplary embodiment, the incoming call and mail information to be displayed on the screen may be limited to predetermined contact information. In regard to the setting of the "alarm time", date may be set to the "alarm time" in addition to the start time and the alarm time. Moreover, the time information displayed in the first low brightness display state may not include the information of day, month, and year, but include only the time information.

In the second exemplary embodiment, after the display in the first low brightness display state, the control unit 1 may stop activating the mobile terminal 10 when there is no operation by the user for a certain time. Note that in such a case, the control unit 1 may detect the input information from key operation by the user and control the mobile terminal 1 to restart, for example.

In the second exemplary embodiment, the size of the text information displayed in the first low brightness display state may be increased from that of the text information displayed on the normal screen, thereby providing the user with more ease of viewing the information. Further, in the first low brightness display state, the control unit 1 may control the key backlight 6-2 not to completely turn off but to be in the state that lights up at the low brightness.

In the second exemplary embodiment, when the user presses the key operation unit in the first low brightness display state, the screen is controlled to the normal display state (step S15 in FIG. 8). However, instead of setting the screen to the normal display state at a time, the background screen may be set to second low brightness at first, which is higher than the first low brightness but lower than the brightness in the normal screen display state. This display state of the screen shall be referred to as a second low brightness display state. This is to prevent the discomfort such as glare generated when the user suddenly looks at the background screen with the normal brightness. Note that in consideration of the circumstance in which the user settles down and uses the mobile terminal, the screen at this time desirably displays the display content for normal usage. After the screen display is set to the second low brightness display state, the control unit may control the display unit to display the screen with the previous brightness or may gradually increases the brightness of the background screen to reach the normal brightness at the end.

Also in the second embodiment, when the user presses the key operation unit in the first low brightness display state, the control unit may control the background screen to gradually return to the normal brightness instead of setting the screen to the normal display state or the second low brightness display state at a time.

Note that the above exemplary embodiments explained cases in which the mobile terminal 10 is activated by opening or closing the housing of the mobile terminal 10. However, it is obvious that similar control as the above explanation can be performed on a mobile terminal that is activated by sliding its housing aside or on a straight mobile terminal that has no opening/closing or sliding movable part and is activated by a key press (operation of an operation unit) or the like. For example, on the straight mobile terminal, in the case where the function of the alarm setting is enabled and the activation of the mobile terminal is stopped, a press on the button of the mobile terminal causes the display screen to be in the above-mentioned first low display state. Then, another press on a button of the mobile terminal may reset the first low brightness display state and returns to the normal display screen. Moreover, similar control can be performed on a touch panel mobile terminal (a display unit and an operation unit physically exist in the same part) in which a user operates the mobile terminal by a finger contacting the display unit.

Further, there may be a light source such as an LED on the housing of the mobile terminal that detects reception of the incoming information and lights up. In that case, the mobile terminal may be controlled in a way that the light source will not light up or be suppressed from lighting up even when the incoming information is received in the first low brightness display state.

Furthermore, there may be another display screen such as a liquid crystal display different from the display unit according to the above exemplary embodiments on a part (back of the display unit, for example) of a housing surface of the mobile terminal. Similar screen control as this exemplary embodiment can be performed on such another display screen.

The mobile terminal may execute the process flow explained in the first or second exemplary embodiments as one of the control methods. For example, the mobile terminal may execute the process flow as a display control program.

The display control program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile terminal comprising:
   a display unit configured to display predetermined information;
   a display control unit configured to control the display unit;
   an input unit configured to allow input of predetermined information; and
   a setting unit configured to set the display unit to a first low brightness display state, the first low brightness display state being the state in which the display unit displays with low brightness,
   wherein:
   when the setting unit sets a display state of the display unit to the first low brightness display state, the display control unit controls the display unit to display only predetermined information that should be displayed while controlling the display unit to display a background screen of the display unit with lowest brightness or brightness near the lowest brightness, which is the first low brightness, at the time of displaying the predetermined information on the display unit;
   the setting unit of the mobile terminal includes a function to count the current time and a function to set a time zone between a pre-set first time and a pre-set second time; and
   the setting unit compares the current time with the time zone, and when the current time is within the time zone, the setting unit sets the display state of the display unit to the first low brightness display state.

2. The mobile terminal according to claim 1, wherein
   when the mobile terminal receives an incoming call or mail, the predetermined information that should be displayed is information regarding the incoming call or mail or information regarding current time and information regarding the incoming call or mail, and
   when there is no incoming call or mail, the predetermined information that should be displayed is information regarding current time.

3. The mobile terminal according to claim 1, wherein the background screen of the display unit is displayed in black and the information displayed on the display unit is displayed in white.

4. The mobile terminal according to claim 1, wherein
   the setting unit of the mobile terminal is the input unit, and
   the setting unit sets the display state of the display unit to the first low brightness display state according to the input from the input unit.

5. The mobile terminal according to claim 1, wherein when the setting unit sets the display state of the display unit to the first low brightness display state, upon detection of the input to the input unit, the display control unit resets the first low brightness display state, which is the display state of the display unit.

6. The mobile terminal according to claim 5, wherein
   when the display control unit resets the first low brightness display state, which is the display state of the display unit, the display control units sets the brightness of the background screen of the display unit to second low brightness which is higher than the first low brightness, and sets the display state of the display unit to the second low brightness display state.

7. The mobile terminal according to claim 6, wherein after the display control unit sets the display state of the display unit to the second low brightness display state, the display control unit gradually increases the brightness of the background screen of the display unit to be brightness in a normally used state.

8. The mobile terminal according to claim 1, further comprising an input unit backlight that illuminates the input unit according to control of the display control unit,
wherein when the setting unit sets the display state of the display unit to the first low brightness display state, the display control unit suppresses the illumination of the input unit backlight.

9. A mobile terminal comprising:
a display unit configured to display predetermined information;
a display control unit configured to control the display unit;
an input unit configured to allow input of predetermined information; and
a setting unit configured to set the display unit to a first low brightness display state, the first low brightness display state being the state in which the display unit displays with low brightness;
wherein:
when the setting unit sets a display state of the display unit to the first low brightness display state, the display control unit controls the display unit to display only predetermined information that should be displayed while controlling the display unit to display a background screen of the display unit with lowest brightness or brightness near the lowest brightness, which is the first low brightness, at the time of displaying the predetermined information on the display unit;
the setting unit of the mobile terminal includes a function to count the current time and a function to set a time zone between a pre-set first time and a pre-set second time;
the setting unit compares the current time with the time zone, and when the current time is within the time zone, the setting unit sets the display state of the display unit to the first low brightness display state;
when the mobile terminal receives an incoming call or mail, the predetermined information that should be displayed is information regarding the incoming call or mail or information regarding current time and information regarding the incoming call or mail; and
when there is no incoming call or mail, the predetermined information that should be displayed is information regarding current time.

10. A mobile terminal comprising:
a display unit configured to display predetermined information;
a display control unit configured to control the display unit;
an input unit configured to allow input of predetermined information;
a setting unit configured to set the display unit to a first low brightness display state, the first low brightness display state being the state in which the display unit displays with low brightness; and
an input unit backlight that illuminates the input unit according to control of the display control unit;
wherein:
when the setting unit sets a display state of the display unit to the first low brightness display state, the display control unit controls the display unit to display only predetermined information that should be displayed while controlling the display unit to display a background screen of the display unit with lowest brightness or brightness near the lowest brightness, which is the first low brightness, at the time of displaying the predetermined information on the display unit;
the setting unit of the mobile terminal includes a function to count the current time and a function to set a time zone between a pre-set first time and a pre-set second time;
the setting unit compares the current time with the time zone, and when the current time is within the time zone, the setting unit sets the display state of the display unit to the first low brightness display state; and
when the setting unit sets the display state of the display unit to the first low brightness display state, the display control unit suppresses the illumination of the input unit backlight.

* * * * *